July 29, 1947.  M. E. GLUHAREFF  2,424,882
HORIZONTAL STABILIZER FOR ROTARY WING AIRCRAFT
Filed Feb. 2, 1945  2 Sheets-Sheet 1
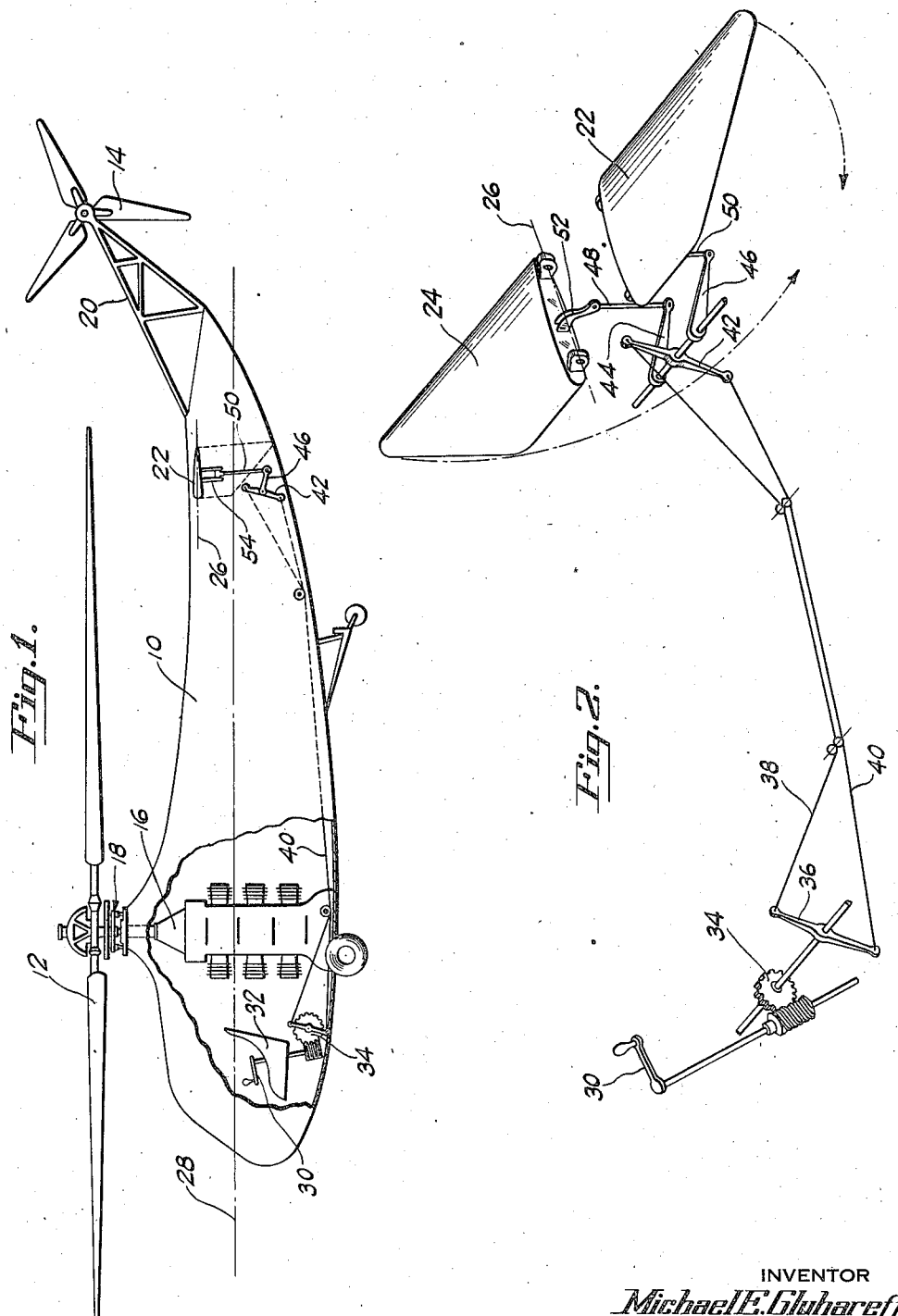
INVENTOR
*Michael E. Gluhareff*
BY
AGENT July 29, 1947.  M. E. GLUHAREFF  2,424,882
HORIZONTAL STABILIZER FOR ROTARY WING AIRCRAFT
Filed Feb. 2, 1945  2 Sheets-Sheet 2

Michael E. Gluhareff
INVENTOR

BY Gifford J. Holmes
AGENT

Patented July 29, 1947

2,424,882

UNITED STATES PATENT OFFICE 2,424,882

HORIZONTAL STABILIZER FOR ROTARY WING AIRCRAFT

Michael E. Gluhareff, Stratford, Conn., assignor to United Aircraft Corporation, East Hartford, Conn., a corporation of Delaware Application February 2, 1945, Serial No. 575,897

3 Claims. (Cl. 244—17)

This invention relates to a helicopter and more particularly to adjustable stabilizing means for a helicopter.

An object of the invention is a helicopter having adjustable stabilizing means.

A further object is an adjustable helicopter stabilizer which may be used as vertical fin area while hovering and as an adjustable area horizontal stabilizer under forward flight conditions.

Other objects and advantages will be apparent from the specification and claims and from the accompanying drawings which illustrate what is now considered to be preferred embodiments of the invention.

In the drawings:

Fig. 1 is a side elevation with a portion broken away to show the controls.

Fig. 2 is an enlarged schematic showing of the stabilizer and its control mechanism.

Figures 3, 4:
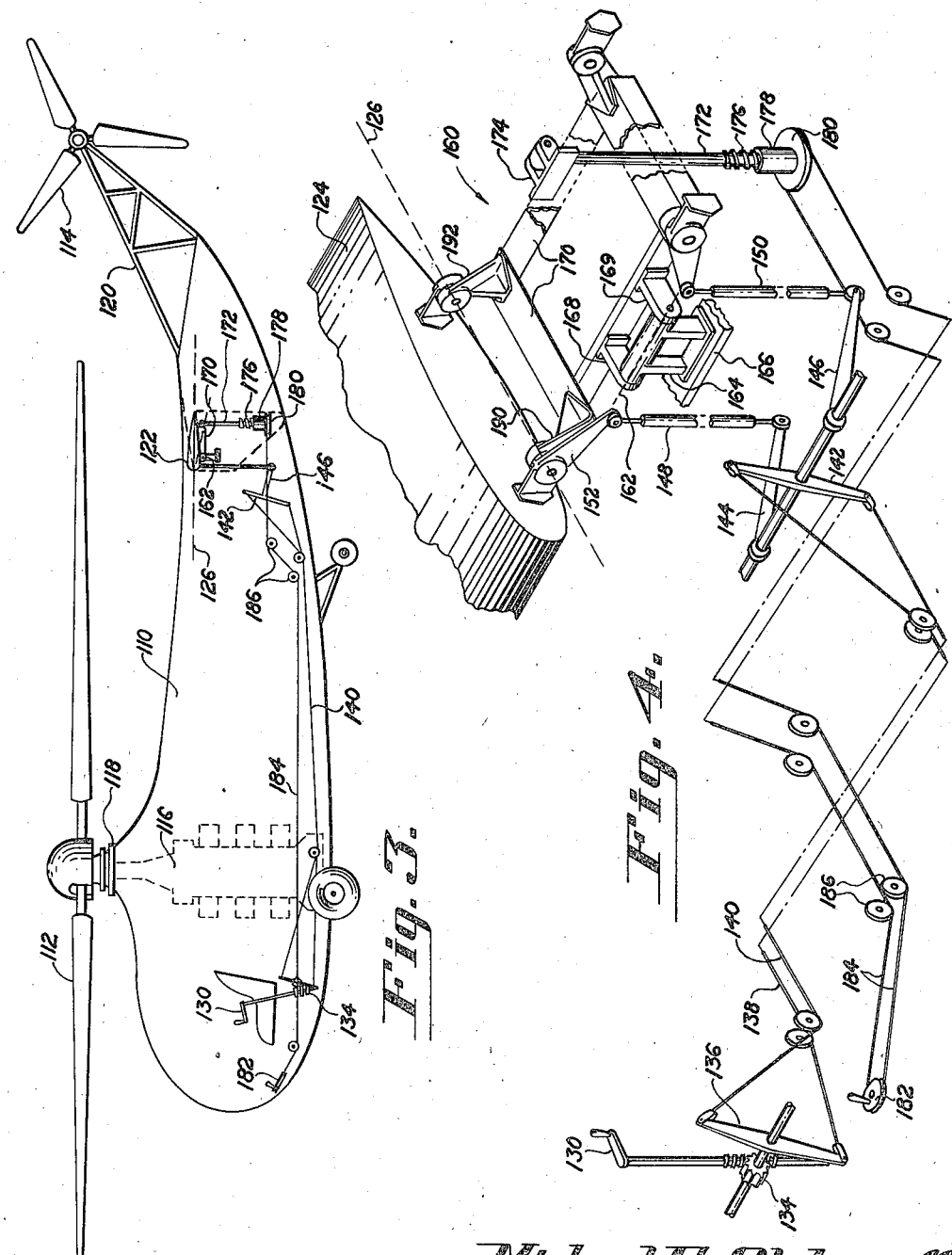
Figs. 3 and 4 are similar to Figs. 1 and 2 but show a modification of the device.

The body or fuselage of a helicopter is not an aerodynamically stable body in the sense of pitching stability. In yaw, however, the auxiliary propeller acts as an additional vertical fin area so that the helicopter body has means to damp any directional instability when the auxiliary propeller is in use.

In order to give the fuselage pitching stability, I propose to add a horizontal stabilizer. Such a stablizer, however, because of its projected horizontal area, acts unfavorably in hovering by forcing the tail down due to down wash from the main rotor. Such a stabilizer in gusty weather or in between buildings, can, under hovering conditions, give the helicopter such violent and unpredictable pitching motions as to become dangerous. If, therefore, a horizontal stabilizer is to be used, it is necessary to remove it or render it ineffective during hovering operations.

The present invention provides a stabilizer which may be readily moved between positions in which it is substantially inoperative as a horizontal stabilizer and positions in which it is effective as a horizontal stabilizer and may be so moved during flight without producing any dangerous or uncontrollable flight conditions.

In the drawings, Fig. 1 shows the stabilizer applied to a helicopter having a fuselage 10 supported by a sustaining rotor 12 and carrying an auxiliary propeller 14. The sustaining rotor is driven by an engine 16 and is controlled by pitch controlling mechanism shown generally at 18. This pitch controlling mechanism includes means for cyclically changing the pitch, and means for simultaneously and equally changing the pitch of all the blades. Further details of the pitch changing mechanism are not shown or described here, as such mechanism is now well known and further description is not necessary to an understanding of the present invention. The auxiliary rotor 14 is permanently connected with the rotor 12 and is driven from the engine 16 by a drive shaft.

The fuselage 10 is shown as an enclosed structure carrying the auxiliary propeller upon an open framework 20. It should be understood, however, that the stabilizer of this invention may be applied to helicopter bodies of various shapes other than the one illustrated.

The stabilizer comprises a pair of airfoils 22 and 24, one on each side of the helicopter body. The airfoils are connected to the fuselage by a hinged joint whose axis 26, in the now preferred embodiment, extends substantially horizontally and parallel to the horizontal axis 28 of the helicopter fuselage.

Movement of the stabilizers about the hinge axis 26 is controlled by a crank 30 located adjacent the pilot's seat 32. Crank 30 acts through a series of cables, levers and gears including worm and gear mechanism 34, double arm lever 36, cables 38 and 40, double arm lever 42, single levers 44 and 46, rods 48 and 50, and arms 52 and 54 to move stabilizer airfoils 22 and 24 about hinge axis 26 and to hold the airfoils in any desired intermediate position. The airfoils may be moved from a substantially horizontal position as shown in Figs. 1 and 2 to a substantially vertical position alongside of the helicopter fuselage, with the chord of the airfoil extending in a fore-and-aft direction as indicated by the dotted lines in Fig. 1. When the stabilizer airfoils are in the position indicated by the dotted lines in Fig. 1, they have substantially no effect on the pitching stability of the helicopter, but they may add to the longitudially extending vertical fin area so that instead of being a detriment and dangerous during hovering they may actually be a slight benefit.

Upon initiation of forward flight, crank 30 may be operated to move airfoils 22 and 24 outwardly about the hinge axis 26. As the airfoils 22, 24 move outward, their angle of incidence with respect to rearwardly moving air is not changed, but their horizontal projected area is increased. This increase in projected area, in effect, gives the stabilizers greater area and, therefore, a greater stabilizing effect.

The angle of incidence of the stabilizer is normally 0 or such an incidence that the helicopter body normally will be held in the desired attitude. If now during forward flight the tail starts to rise, a change of angle of attack of the stabilizer immediately results which will act to so change the lift of the stabilizer as to return the helicopter body to its desired attitude. The force available to restore the helicopter may be varied by varying the effective area of the stabilizer, and the amount of this force will determine the extent of movement or the amplitude of the pitching movement of the helicopter body before it returns to the desired attitude. A small force will take longer to restore the body, hence give larger pitching movements or greater amplitude and a large force will give a smaller amplitude but may render the machine so stable that it will prevent a desired change in attitude and reduce the maneuverability of the helicopter. By providing an adjustable stabilizer, as above described, the stabilizer can be adjusted for any given flight condition to give the desired stability and still retain the desired maneuverability.

In Figs. 3 and 4 a modification of the present invention is shown. The reference characters are the same as those used in the description of the structure in Figs. 1 and 2 (except that 100 has been added to these characters) to identify similar parts.

In Fig. 4 a tiltable platform 160 is provided for the airfoil 124 and for an oppositely disposed airfoil, not shown. The platform 160 may rotate around an axis 162 which defines the center of rotation of a hinge 164 connected to a portion 166 of the airplane body and rotatably carried upon the pivot brackets 168 and 169. The frame 170 can be rocked up and down around the axis 162 by raising and lowering a rod 172 which is connected to the frame 170 by a pivot bracket 174. The rod 172 has a worm 176 at its lower end which cooperates with a mating screw sleeve 178 that is mounted for rotation upon a suitable support, not shown. For raising and lowering the rod 172, a pulley wheel 180 can be moved in one direction or the other from a hand wheel 182 through suitable cables and pulleys 184 and 186 between the pulley wheel 180 and the hand wheel 182.

The airfoil 124 is pivotally mounted upon brackets 190 and 192 carried by the tiltable platform 170. A bracket 152 carried by the pivot can be moved up and down in the same manner as described in connection with Figs. 1 and 2.

In operating the device disclosed in Figs. 3 and 4, the horizontal projected area of the airfoils of the stabilizer can be changed by operating the crank 130 to raise and lower the airfoils. In addition to this action, the angle of attack of the stabilizer airfoils can be changed by moving the hand wheel 182. By such a universal control of the airfoil, it is possible to set the airfoil into a number of different attitudes required for different forward speeds of the aircraft 110. It is also possible to move the stabilizer airfoils downwardly into the inoperative position, or upwardly, to extend above the fuselage to give additional vertical fin area and, hence, greater lateral stability to the helicopter.

With my invention, it is also possible to change the relative drag between the rotor and the fuselage by changing the angle of attack (and hence the drag and lift) of the stabilizer airfoils and/or by changing the effective horizontal area of the stabilizer to vary the resultant force exerted upon the craft by the downwash of the sustaining rotor and the velocity of forward flight. Thus, the attitude of the entire aircraft can be controlled in a manner to prevent excessive pitching by the fuselage when the rotor is tilted fore or aft to propel the craft. Such trimming of the craft will reduce the total drag of the aircraft with the attendant economy of operation, and will be conducive to greater comfort for passengers.

An additional advantage of trimming the fuselage of the helicopter is gained in preventing undue strain on the rotor head due to improper relationship between the rotor and fuselage. When a helicopter is to be driven forward by the rotor the pitch controls, not shown, are actuated to cause the plane of the rotors to tilt forwardly so that a horziontal component of thrust from the rotor is obtained. Due to aerodynamic action upon the blades upon translation of the craft through the air, a slightly reversed or negative tilting force will act upon the blades. This may cause undue stresses in the blades if they engage blade stops usually used to prevent excessive drooping of the blades, and may damage the same. The path of rotation of the blades is usually so selected that for ordinary attitudes of the fuselage of the helicopter, such undesirable negative tilting of the rotor with respect to the balance of the aircraft will not occur. However, due to the change in the center of gravity of the craft because of using up gasoline, for example, or because of different cargo weights, this center of gravity can be different for different loaded conditions of the craft and can also change when the aircraft is in flight.

Instances have been noted where the aircraft is excessively loaded in the aft portion that even with maximum forward control only about one-third of the maximum speed has been attained. With applicant's invention applied, the stabilizers can be adjusted to trim the craft so that proper control action can be obtained and also prevent the possibility of blades flapping against stops to thus avoid injuring the blades.

While I have shown two forms that my invention may take, it is to be understood that I wish not to be limited in my invention only to those forms, but by the spirit and the scope of the following claims.

I claim:

1. In a helicopter comprising, a body, a tail on said body, and a sustaining rotor for said body, first hinge means mounted on said tail and having a pivot axis substantially parallel to the longitudinal axis of said helicopter, second hinge means mounted on said tail and having a pivot axis substantially normal to said longitudinal axis, means for damping pitching movements of said helicopter and for trimming said helicopter about said longitudinal axis comprising, a stabilizer adjacent said tail and connected to both of said hinge means, control means for moving said stabilizer about either or both of said hinge means.

2. In a helicopter comprising a body, a tail on said body, and a sustaining rotor for said body, first hinge means mounted on said tail and having a pivot axis substantially parallel to the longitudinal axis of said helicopter, second hinge means mounted on said tail and having a pivot axis substantially normal to said longitudinal axis, means for damping pitching movements of said helicopter and for trimming said helicopter about said longitudinal axis comprising, a stabilizer adjacent said tail and connected to both of said hinge means, control means for moving said stabilizer about either said first hinge means to vary the horizontal projected area of said stabilizer or about said second hinge means to vary the angle of incidence of said stabilizer.

3. In a helicopter comprising a body, a tail on said body, and a sustaining rotor for said body, first hinge means mounted on said tail and having a pivot axis substantially parallel to the longitudinal axis of said helicopter, second hinge means mounted on said tail and having a pivot axis substantially normal to said longitudinal axis, means for damping pitching movements of said helicopter and for trimming said helicopter about said longitudinal axis comprising, a stabilizer adjacent said tail and connected to both of said hinge means, first control means for moving said stabilizer about said first hinge means to vary the horizontal projected area of said stabilizer, and second control means for moving said stabilizer about said second hinge means to vary the angle of incidence of said stabilizer.

MICHAEL E. GLUHAREFF.

REFERENCES CITED

The following references are of record in the file of this patent:

UNITED STATES PATENTS

| Number | Name | Date |
|---|---|---|
| 1,568,765 | Ortego | Jan. 5, 1926 |
| 2,037,745 | Vaughn | Apr. 21, 1936 |
| 1,836,617 | Perrin | Dec. 15, 1931 |

FOREIGN PATENTS

| Number | Country | Date |
|---|---|---|
| 432,245 | Great Britain | July 18, 1935 |
| 851,767 | France | Oct. 9, 1939 |